US011012832B2

(12) United States Patent
Ivanov et al.

(10) Patent No.: US 11,012,832 B2
(45) Date of Patent: May 18, 2021

(54) METRIC FOR EVALUATING INDOOR POSITIONING SYSTEMS

(71) Applicant: HERE Global B.V., Eindhoven (NL)

(72) Inventors: Pavel Ivanov, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/729,782

(22) Filed: Dec. 30, 2019

(65) Prior Publication Data
US 2020/0137532 A1 Apr. 30, 2020

Related U.S. Application Data

(63) Continuation of application No. 15/631,662, filed on Jun. 23, 2017, now Pat. No. 10,555,132.

(51) Int. Cl.
*H04W 24/00* (2009.01)
*H04W 4/33* (2018.01)
(Continued)

(52) U.S. Cl.
CPC .............. *H04W 4/33* (2018.02); *G01S 5/0252* (2013.01); *H04W 4/023* (2013.01); *H04B 17/318* (2015.01)

(58) Field of Classification Search
None
See application file for complete search history.

(56) References Cited

U.S. PATENT DOCUMENTS

| 2005/0003827 A1 | 1/2005 | Whelan |
| 2011/0037571 A1 | 2/2011 | Johnson, Jr. et al. |

(Continued)

FOREIGN PATENT DOCUMENTS

| CN | 102480677 A | 5/2012 |
| CN | 107979810 A | 5/2018 |

(Continued)

OTHER PUBLICATIONS

Ekahau Site Survey & Heatmap Visualizations, Ekahau (Year: 2016).*

(Continued)

*Primary Examiner* — Gary Lafontant
(74) *Attorney, Agent, or Firm* — Lempia Summerfield Katz LLC

(57) ABSTRACT

A method, apparatus, computer program or system includes obtaining fingerprints including a piece of position information and gathered in a venue; determining a first metric based on the fingerprints indicative of a quality value of the obtained fingerprints that indicates for each piece of position information of the fingerprints whether or not the quality and/or a quantity of the obtained fingerprints with respect to the piece of position information is sufficient; determining a second metric based on the obtained fingerprints indicative of a quality value of an infrastructure of the venue, the fingerprints are gathered from one or more radio nodes of the infrastructure, and the second metric indicates for each of the pieces of position information of each of the respective fingerprints whether or not the quality of the infrastructure is sufficient; determining a third metric indicative of an evaluation of the quality of the infrastructure of the venue based on the second metric; and outputting the first metric, the second metric and/or the third metric.

20 Claims, 6 Drawing Sheets

(51) Int. Cl.
   *G01S 5/02* (2010.01)
   *H04W 4/02* (2018.01)
   *H04B 17/318* (2015.01)

(56) References Cited

U.S. PATENT DOCUMENTS

| | | | |
|---|---|---|---|
| 2012/0150434 A1* | 6/2012 | Cho | G01C 21/367 |
| | | | 701/445 |
| 2012/0195215 A1* | 8/2012 | Jeong | H04W 64/006 |
| | | | 370/252 |
| 2013/0155102 A1 | 6/2013 | Gonia et al. | |
| 2015/0312774 A1 | 10/2015 | Lau | |
| 2016/0337804 A1 | 11/2016 | Kim et al. | |

FOREIGN PATENT DOCUMENTS

| | | |
|---|---|---|
| WO | WO2016086993 A1 | 6/2016 |
| WO | WO2016086994 A1 | 6/2016 |
| WO | WO2016087008 A1 | 6/2016 |
| WO | WO2016169601 A1 | 10/2016 |

OTHER PUBLICATIONS

Ekahau Site Survey & Planner Wi-Fi planning, site survey and WLAN troubleshooting solution, (https://www.ekahau.com/products/ekahau-site-survey/features/), Jun. 27, 2017, pp. 1-13.
Ekahau, Ekahau Site Survey & Heatmap Visualizations, Jul. 4, 2016, Ekahau, inc, 48 pages.
European Search Report dated Nov. 14, 2018 for corresponding European patent application 181792292-1206.
European Office Action for European Patent Application No. 18 179 229.2-1206 dated Feb. 3, 2020.
Chinese Office Action for Chinese Application No. 201810661501.2 dated Apr. 27, 2020.

* cited by examiner

METRIC FOR EVALUATING INDOOR POSITIONING SYSTEMS

CROSS REFERENCE TO PRIOR APPLICATION

This application is a continuation under 35 U.S.C. § 120 and 37 C.F.R. § 1.53(b) of U.S. patent application Ser. No. 15/631,662 filed Jun. 23, 2017, which is hereby incorporated by reference in its entirety.

FIELD

The following disclosure relates to the field of indoor positioning systems, in particular of an evaluation metric which might be used for achieving accurate indoor positioning performance.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (GPS-like short-range beacons), ultra-sound positioning, BTLE signals (e.g. High-Accuracy Indoor Positioning, HAIP) and Wi-Fi fingerprinting. What is typical to these solutions is that they require either deployment of totally new infrastructure (beacons, tags to name but a few non-limiting examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radiomaps and is hereby able to capture the dynamics of the indoor radio propagation environment in a compressable and highly accurate way. This makes it possible to achieve unprecedented horizontal positioning accuracy with the Wi-Fi signals only within the coverage of the created radiomaps and also gives highly reliable floor detection.

To setup indoor positing in a building, the radio environment in the building needs to be surveyed. This phase is called "radiomapping". In the radiomapping phase samples containing geolocation (like latitude, longitude, altitude; or x, y, floor) and radio measurements (Wi-Fi and/or Bluetooth radio node identities and signal strengths). Having these samples allows understanding how the radio signals behave in the building. This understanding is called a "radiomap". The radiomap enables localization capability to devices when they observe varying radio signals, the signals can be compared to the radiomap resulting in the location information.

The radio samples for the radiomap may be collected with separate tools or crowd-sourced from the user devices. While automated crowd-sourcing can enable indoor localization in large amount of buildings, manual data collection using special tools may be the best option, when the highest accuracy is desired.

SUMMARY

When manually collecting radio data in a venue (e.g. a building, shopping mall, university to name but a few non-limiting examples), the user (e.g. a person performing the radio data collection) will face the obvious question, if and/or when the user has collected enough data (e.g. all over the venue at sufficient density) so that accurate indoor positioning and/or floor detection can be performed. And even if the sample coverage and density are high enough, it may still be that the overall positioning quality is not high, because the building does not have enough radio nodes (e.g. Wi-Fi and/or Bluetooth nodes) to support indoor positioning. It would be appreciated to present this complex information to a non-professional user so that sufficient data can be collected more easily.

Moreover, it is important to indicate insufficient radio infrastructure in time before the user collects data thoroughly in the venue and thus consumes a lot of time for the radio survey. In any case, the radio survey must only be done thoroughly after the radio infrastructure sufficiency has been ensured.

It is thus, inter alia, an object of the following embodiments to provide an evaluation of the sufficiency of data collection (of fingerprints) and/or of the sufficiency of the radio infrastructure for indoor positioning systems.

According to a first exemplary embodiment of the present following embodiments, a method is disclosed, the method comprising:

obtaining a plurality of fingerprints, wherein each fingerprint comprises a piece of position information, and wherein each fingerprint is gathered in a venue;

determining a first metric based at least partially on the obtained plurality of fingerprints, wherein the first metric is indicative of a quality value of the obtained plurality of fingerprints, wherein the first metric indicates for each piece of position information of the plurality of fingerprints whether or not the quality and/or a quantity of the obtained fingerprints with respect to the piece of position information is sufficient;

determining a second metric based at least partially on the obtained plurality of fingerprints, wherein the second metric is indicative of a quality value of an infrastructure of the venue, wherein the plurality of fingerprints are gathered from one or more radio nodes comprised by the infrastructure, and wherein the second metric indicates for each of the pieces of position information of each of the respective fingerprints whether or not the quality of the infrastructure is sufficient;

determining a third metric indicative of an evaluation of the quality of the infrastructure of the venue based at least partially on the second metric; and outputting the first metric, the second metric and/or the third metric.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the server or the electronic device.

According to a further exemplary aspect of the following embodiments, a computer program is disclosed, the computer program when executed by a processor causing an apparatus, for instance the server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the following embodiments, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the following embodiments, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the following embodiments may be a module or a component for a device, for example a chip. Alternatively, the disclosed apparatus according to any aspect of the following embodiments may be a device, for instance a server or server cloud, or any other kind of electronic device, e.g. a mobile (e.g. smartphone, tablet, to name but a few non-limiting examples) or a stationary device (e.g. navigation device comprised by a vehicle, to name but one non-limiting example). The disclosed apparatus according to any aspect of the following embodiments may comprise only the disclosed components, for instance means, processor, memory, or may further comprise one or more additional components.

According to a further exemplary aspect of the following embodiments, a system is disclosed, comprising:

an apparatus according to any aspect of the embodiments as disclosed above, and an electronic device, wherein the electronic device is configured to gather one or more fingerprints.

The apparatus may for instance be a server or any other kind of mobile or stationary device, and is in the following also referred to as "first apparatus". The electronic device may for instance be a mobile (e.g. smartphone, tablet, to name but a few non-limiting examples) or a stationary device (e.g. navigation device comprised by a vehicle, to name but one non-limiting example). The apparatus and the electronic device each may comprise a processor, and linked to the processor, a memory. The memory may for instance store computer program code for obtaining data associated with each road segment of at least one road segment, for obtaining probe data associated with the respective road segment, and for determining a sinuous driving metric. The processor is configured to execute computer program code stored in the memory in order to cause the apparatus and/or the electronic device to perform one or more desired actions. The memory may for instance be an example embodiment of a non-transitory computer readable storage medium, in which computer program code according to the embodiments may be stored.

In the following, exemplary features and exemplary embodiments of all aspects of the present embodiments will be described in further detail.

Each of the plurality of fingerprints may for instance stem from the electronic device. Each of the plurality of fingerprints may for instance be received from the electronic device, or from other entity that transmits a fingerprint, e.g. to the first apparatus. One of the plurality of fingerprints may alternatively stem from an entity that is different from the electronic device, e.g. a server of a computer. The entity may for instance desire an evaluation of the plurality of fingerprints of a venue, and to be provided the evaluation to the electronic device, e.g. for enhancing the gathering of fingerprints of the venue for usage in indoor positioning and/or floor detection.

The determined third metric may for instance be used by a user. The user may for instance be the individual performing a gathering of a plurality of fingerprints for a venue (e.g. manual data collection), based on which gathered plurality of fingerprints indoor positioning and/or floor detection may be performed.

The electronic device may for instance be an electronic device. The electronic device may for instance be portable (e.g. weigh less than 5, 4, 3, 2, or 1 kg). The electronic device may for instance comprise or be connectable to a display for displaying a radiomap, and additionally a visualization of the determined third metric, e.g. that is guiding respectively navigating a user, e.g. for gathering additional one or more fingerprints of the venue, or identifying one or more parts (e.g. areas) of the venue in which additional infrastructure (e.g. radio nodes) may for instance be added (e.g. installed). The electronic device may for instance comprise or be connectable to means for outputting sound, e.g. in the form of spoken commands or information. The electronic device may for instance comprise or be connectable to one or more sensors for determining the electronic devices position, such as radio-based indoor positioning from e.g. observed RSS-measurements as e.g. horizontal position, for in case it is available inside the venue, for instance a Global Navigation Satellite System (GNSS) receiver, e.g. in the form of a Global Positioning System (GPS) receiver.

A fingerprint comprises a piece of position information representing a horizontal position (e.g. a location), and the fingerprint comprises one or more identifiers of radio nodes, which transmitted signal is receivable at the horizontal position represented by the position information. Based on a respective identifier of a radio node, the horizontal position of said radio node may for instance be determined. For instance, a database may comprise the horizontal position of a radio node corresponding to the identifier of the radio node. Additionally, the fingerprint may for instance comprise a received signal strength (RSS) of the one or more signals transmitted by the one or more radio nodes. In case the fingerprint does not comprise the RSS, a value of the RSS may for instance be determined based, at least partially on the piece of position information and the identifier of the respective radio node. Based on the identifier of the radio node, the horizontal position may for instance be determined. Using for instance a channel model representing the propagation of signals transmitted by the radio node, the RSS of signals received at the horizontal position of the RSS may for instance be determined. More accurate values for RSS are obtained in case the RSS is e.g. measured and being comprised by the fingerprint.

A fingerprint may for instance be gathered (e.g. measured) by the electronic device. A fingerprint may for instance be gathered by obtaining a piece of position information (e.g. determining a horizontal location) and by measuring signals transmitted by one or more radio nodes, which are receivable at the horizontal location the electronic device is located during the gathering of the fingerprint.

The plurality of fingerprints are for instance gathered by a plurality of electronic devices, wherein each of the plurality of electronic device e.g. measures signals transmitted from one or more radio nodes, which signal is receivable with one or more sensors (e.g. Bluetooth and/or Wi-Fi receiver(s)). Each of the plurality of fingerprints comprises one or more identifiers of the one or more radio nodes, also referred to as a "set of radio nodes".

Each fingerprint may for instance comprise at least one value of a received signal strength being associated with the piece of position information comprised by the fingerprint and representing the location of the venue from which the value of the signal strength is gathered (e.g. measured). Each fingerprint of the plurality of fingerprints may for instance represent a sample gathered (e.g. measured) by an electronic device, wherein the RSS of all signals transmitted by one or more radio nodes (also referred to as a set of radio nodes) receivable is measured. Each of such a fingerprint may for instance be measured e.g. by one or more sensors (e.g. receivers, BTLE and/or Wi-Fi receiver(s)) of the electronic device.

The infrastructure may for instance comprise one or radio nodes (e.g. Beacons or Wi-Fi Access Points) and their location in the venue. The venue may for instance be a building, shopping mall, office complex, public accessible location (e.g. station, airport or the like) to name but a few non-limiting examples.

The first metric may for instance be represented by a first value. The first value may for instance be indicative of e.g. a low, a high, or optionally a medium state associated with the quality of the plurality of fingerprints obtained for the infrastructure of the venue. The first metric may for instance be binary value, wherein the binary value may for instance be indicative of a low quality value, and a high quality value. In case the first value is optionally indicative of a medium state, the second metric may for instance be represented by a value being capable of being assigned with at least three different values.

The second metric may for instance be represented by a second value. The second value may for instance be indicative of e.g. a low, a high, or optionally a medium state associated with the quality of the infrastructure of the venue. The second metric may for instance be binary value, wherein the binary value may for instance be indicative of a low quality value, and a high quality value. In case the second value is optionally indicative of a medium state, the second metric may for instance be represented by a value being capable of being assigned with at least three different values.

The third metric is determined based at least partially on the second metric. Alternatively, on the first metric and the second metric. The second metric is more primary than the first metric, because the infrastructure of the venue may be needed to be secured first, and then the fingerprints in the venue may be obtained. Since the second metric is more primary than the first metric, the second metric may for instance be determined prior to determining the first metric. In case the determined second metric is indicative of a low quality infrastructure, the first metric may not be determined, e.g. for enhancing the efficiency of the method by e.g. avoiding unnecessary processing. In particular, this may apply since the method according to the first aspect of the present embodiments may for instance require significant processing power dependent upon the amount of fingerprints used in the method according to the first aspect of the present embodiments.

The third metric may for instance be indicative of one or more causes for unsatisfactory indoor positioning accuracy and/or floor detection in the venue. Further, the third metric may for instance be indicative of corrective actions to solve one or more causes for unsatisfactory indoor positioning accuracy and/or floor detection.

The third metric is determined for instance be the determined second metric. For instance, the third metric is determined by analyzing the second metric, e.g. identifying one or more areas of the venue, in which the quality value of the infrastructure of the venue represents e.g. a low or a medium state. In case the second metric is represented by a "low" or "medium" value, the third metric is determined to represent the quality of the infrastructure is not sufficient. Additionally, the third metric may for instance be determined to represent a suggestion to the user that one or more radio nodes need to be added to the infrastructure of the venue, in particular in one or more areas of the venue having a low or medium quality in these areas of the venue of the infrastructure. In case the second metric is represented by a "high" value, the third metric is determined to represent the quality of the infrastructure is sufficient. Additionally, the third metric may for instance be determined to represent a suggestion to the user that no actions from the user are required.

Alternatively, the third metric may for instance be determined by evaluating the determined first metric and the determined second metric. In this case, the third metric may for instance be indicative of the (e.g. overall) quality of the obtained plurality of fingerprints and the quality of the infrastructure of the venue. Further, in this case, the third metric may for instance be determined based at least partially on the first metric and on the second metric. The underlying principle for determining the third (overall) evaluation of the quality of the obtained plurality of fingerprints and of the quality of the infrastructure of the venue is as follows:

i) In case the first metric is represented by a "high" value and the second metric is represented by a "high" value, the third metric is determined to represent an (overall) high evaluation. Additionally, the third metric may for instance be determined to represent a suggestion to the user that no actions from the user are required.

ii) In case the first metric is represented by a "low" value and the second metric is represented by a "high" value, the third metric is determined to represent an (overall) low evaluation. Additionally, the third metric may for instance be determined to represent a suggestion to the user that additional one or more fingerprints e.g. in one or more areas of the venue having a low quality of the obtained plurality of fingerprints need to be obtained.

iii) In case the first metric is represented by a "low" value and the second metric is represented by a "low" value, the third metric is determined to represent an (overall) low evaluation. Additionally, the third metric may for instance be determined to represent a suggestion to the user that one or more radio nodes need to be added to the infrastructure of the venue, in particular in one or more areas of the venue having a low quality in these areas of the venue of the infrastructure.

iv) In case the first metric is represented by a "high" value and the second metric is represented by a "low" value, the third metric is determined to represent an (overall) low evaluation. Additionally, the third metric may for instance be determined to represent a suggestion to the user that one or more radio nodes need to be added to the infrastructure of the venue, in particular in one or more areas of the venue having a low quality in these areas of the venue of the infrastructure.

The quality of the obtained fingerprints may for instance be indicative of the amount of fingerprints which are obtained at one or more areas of the venue. The one or more areas are may for instance be defined by at least two pieces of position information representing locations inside the venue. The quality of the obtained fingerprints may for instance be indicative of the coverage of the one or more areas of the venue for which fingerprints are gathered and/or of the density of the gathered fingerprints, which needs to be high enough to support accurate indoor positioning and/or floor detection.

The quality of the infrastructure of the venue may for instance be indicative of the indoor positioning performance and/or floor detection performance being not high, since the venue does not have enough radio nodes (e.g. beacons and/or Wi-Fi Access points) comprised by its infrastructure to support accurate indoor positioning and/or floor detection.

The positioning information may for instance be indicative of a horizontal position and/or a floor of a venue. The positioning information may for instance comprise by at least one pair of latitude/longitude coordinates, and additionally an altitude, or x, y-coordinates, and additionally a floor level of the venue.

The infrastructure may for instance comprise one or more radio nodes (e.g. beacons for indoor positioning and/or floor detection according to the Bluetooth Low Energy specification, and/or Wi-Fi Access Points for indoor positioning and/or floor detection according to the Wireless Local Area Network specification).

The radio nodes of the infrastructure of a venue may for instance transmit one or more signals comprising at least an identifier of said radio node. In case the one or more transmitted signals of the radio node is received, the radio node may for instance be identified based at least partially on the identifier comprised by the one or more signals.

The determined third metric is then output, e.g. to the electronic device or to another apparatus that transfers the third metric to the electronic device. The third metric may for instance be used for visualizing the quality of fingerprints and/or the quality of the infrastructure which is used for indoor positioning and/or floor detection in the venue.

Example embodiments thus make it possible to determine (e.g. at a server or a server cloud) a third metric being indicative of an evaluation of the obtained plurality of fingerprints. The determined third metric may for instance be used in e.g. identifying a part (e.g. region and/or area) of a venue where indoor positioning accuracy and/or floor detection may be unsatisfactory, and the third metric is indicative of one or more causes for the unsatisfactory indoor positioning accuracy and/or floor detection. Further, the third metric may be used for deriving corrective actions to solve the one or more causes for the unsatisfactory indoor positioning accuracy and/or floor detection.

It should be noted that the step of determining the first metric and the step of determining the second metric may take place in parallel. For instance, after obtaining the plurality of fingerprints, the first and the second metric may be determined. The third metric may then be determined after determining the first and the second metric. Alternatively, the second metric may be determined prior to determining the first metric due to the second metric is more primary than the first metric—as already described above.

According to an exemplary embodiment of all aspects of the present embodiments, the quality value of the obtained plurality of fingerprints and/or the quality value of the infrastructure of the venue represent one of the following states i) to iii):

i) infrastructure quality and/or fingerprint quality is low;
ii) infrastructure quality and/or fingerprint quality is medium;
iii) infrastructure quality and/or fingerprint quality is high.

As already disclosed above in this specification, the state i) represents that the quality of the infrastructure is low (e.g. not enough radio nodes are comprised by the infrastructure in one or more affected areas of the venue), or that the fingerprint quality is low (e.g. not enough fingerprints are gathered for one or more affected areas of the venue), or the state iii) represents that the infrastructure quality and the fingerprint quality is high, wherein in the last case the plurality of fingerprints and the infrastructure used for performing indoor positioning and/or floor detection are sufficient to support accurate indoor positioning and/or floor detection.

The state ii) represents that the infrastructure quality and/or the fingerprint quality is medium. The additional state of "medium" representing the quality of the obtained fingerprints and/or of the infrastructure of the venue may for instance be used to indicate one or more areas of the venue in which additional one or more fingerprints and/or additional one or more radio nodes being added to the infrastructure may further enhance the performance of the indoor positioning and/or floor detection.

In case the third metric is indicative of an evaluation of the quality of the obtained plurality of fingerprints and the quality of the infrastructure of the venue, the evaluation of the obtained plurality of fingerprints may for instance represent one of the states i) to iii).

According to an exemplary embodiment, in case the second metric is indicative of the state i) represented by a quality value indicative of the infrastructure quality is low, the third metric is determined to represent an overall low quality state (e.g. infrastructure quality needs to be enhanced since the quality of the infrastructure needs to be assured first in order to achieve more accurate indoor positioning and/or floor detection), independent of whether or not the first metric is indicative of that the quality of the obtained fingerprints is sufficient.

In this exemplary embodiment, the second metric is more primary than the first metric, because the infrastructure may be needed to be secured first and only then a plurality of fingerprints should be obtained. In case e.g. additional radio nodes are added to the infrastructure of the venue, previously obtained fingerprints may for instance be obsolete, since the adding of additional one or more fingerprints changes the fingerprints which can be gathered in part of the venue where one or more additional radio nodes are added.

According to an exemplary embodiment, in case the first metric indicates that the quality of the obtained plurality of fingerprints with respect to the position information is not sufficient, at least a part of the outputted first metric represents that additional one or more fingerprints need to be obtained.

In this way, the user (e.g. the individual setting up the infrastructure and gathering radio data for providing indoor positioning service and/or floor detection in a venue) is suggested, what kind of corrective the user needs to take in order to provide seamless indoor positioning service and/or floor detection).

According to an exemplary embodiment, in case the second metric indicates that the quality of the infrastructure is not sufficient, at least a part of the outputted second metric and/or the outputted third metric represents that the infrastructure needs to be expanded, and after the expansion, additional one or more fingerprints need to be obtained.

The infrastructure of the venue may for instance be expanded by adding one or more radio nodes (e.g. beacons and/or Wi-Fi Access Points) to the venue. In particular, at areas of the venue which are determined according to the third metric of having a low quality of the infrastructure, one or more of said radio nodes may for instance be added. Further, the additional radio nodes may for instance be added at one or more areas of the venue, where no other radio nodes are located.

According to an exemplary embodiment, the first metric is determined based at least partially on a fingerprint density analysis, wherein the fingerprint density analysis comprises analyzing how many fingerprints of the plurality of fingerprints are associated with an area of the venue.

An area of the venue may for instance be a pre-defined or determined according to pre-defined rules part (e.g. of a predefined size and shape (e.g. quadratic)) of the venue.

This may for instance be analyzed based at least partially on the plurality of fingerprints. For instance, after defining one or more areas for the venue, for each of the area it may be checked how many fingerprints of the obtained plurality of fingerprints are located within said area. This may for instance be determined based at least partially on the piece of position information of each respective fingerprint. For each of the one or more areas of the venue, enough fingerprints need to be obtained. For instance, whether or not enough fingerprints are obtained for an area of the venue, may be determined based at least partially on a comparison with a reference value indicating how many fingerprints should be associated or being obtained for each of the one or more areas of the venue. Based on the amount of fingerprints associated with each of the one or more areas of the venue, the density of the fingerprints for each of said one or more areas may for instance be determined.

Further, the fingerprint density analysis may for instance comprise a checking of the determined density with a threshold value. In case a pre-defined or defined according to pre-defined rules density of the fingerprints associated with one of the one or more areas of the venue is reached, saturation may occur. Thus, no further fingerprints for said area need to be obtained. Additional one or more fingerprints may then for instance not further enhance the performance of indoor positioning and/or floor detection performed within said area of the venue.

Analyzing how many fingerprints of the plurality of fingerprints are associated with an area of the venue may for instance be performed by interpolating distances between each respective fingerprints of the set of fingerprints, e.g. corresponding to the position information. At least the distances between adjacent fingerprints may for instance be interpolated. For the interpolation, for instance so-called Delaunay triangles may be formed based, at least partially, on the respective fingerprints of the plurality of fingerprints, e.g. corresponding to the respective position information. The density of the fingerprints may for instance represent whether or not enough fingerprints are obtained for an area of the venue, e.g. the sufficiency of the obtaining of the fingerprints may for instance be evaluated. The sufficiency may for instance be estimated from the triangle edge lengths of the formed Delaunay triangles. In case the edge length is relatively short compared e.g. to a pre-defined or determined according to pre-defined rules threshold value (e.g. edge length of each respective triangle is below the threshold value), the fingerprint density analysis may for instance represent that enough fingerprints of an area of the venue are obtained. In case the edge length is relatively long compared e.g. to a pre-defined or determined according to pre-defined rules threshold value (e.g. edge length of each respective triangle is above the threshold value), the fingerprint density analysis may for instance represent that not enough fingerprints of an area of the venue are obtained. In comparison to checking how many fingerprints of the obtained plurality of fingerprints are located within an area of the venue, interpolating distances between each respective fingerprints of the plurality of fingerprints may for instance resemble the density resulting of the checking described above, but may give a result from a different approach.

According to an exemplary embodiment, the first metric is determined based at least partially on a similarity of nearby fingerprints analysis, wherein the similarity of nearby fingerprints analysis comprises analyzing whether or not at least two fingerprints associated with an area of the venue (e.g. nearby (neighboring) fingerprints associated with adjacent horizontal positions in the venue; e.g. represented by the position information) comprise at least similar identifiers of one or more radio nodes.

For instance, it may be analyzed if at least two of the plurality of fingerprints associated with nearby locations (e.g. the pieces of position information comprised by the fingerprints indicate that the fingerprints were obtained at adjacent (e.g. neighboring horizontal positions within the venue) comprise equal or comparable identifiers of radio nodes (e.g. comprise an equal or similar or comparable set of radio nodes). In case there is no similarity between the at least two fingerprints of the same area of the venue, for instance different set of radio nodes are comprised by the at least two fingerprints, it may be assumed that there is at least one obstacle of the venue (e.g. a wall, installation, object, to name but a few non-limiting examples) causing the difference(s). For instance, in such an area of the venue, the fingerprints obtained of said area of the venue may not be densely enough (e.g. more fingerprints need to be obtained from said area of the venue compared to another area of the venue in which none of said obstacles are located). In this way, for instance rapid signal strength change receivable, which is caused by said obstacles, may be captured so that accurate indoor positioning and/or floor detection may be performed.

According to an exemplary embodiment, the second metric is determined based at least partially on a number of radio nodes associated with the position information comprised by each of the plurality of fingerprints.

For instance, based on the number of radio nodes, the more radio nodes are receivable at a location of the venue represented by the piece of position information comprised by the fingerprint, the better the infrastructure at said location of the venue may be. Thus, it may be assumed that the quality of the infrastructure at said location is better. The number of radio nodes may for instance be determined based at least partially on the number of identifiers comprised by each respective fingerprint. The more radio nodes may for instance be used for indoor positioning and/or floor detection at a given location of the venue, the better the positioning respective floor detection accuracy may be.

According to an exemplary embodiment, the second metric is determined based at least partially on an average or a median value of one or more received signal strengths, wherein the average or the median value is calculated based on each of the one or more received signal strengths of the one or more radio nodes of each respective fingerprint.

The average or median value of the observed RSS may for instance be determined by selecting the received signal strength value from each of the one or more radio nodes comprised by the respective fingerprint and calculating the arithmetical average (e.g. mean value) or the median average value.

Additionally, the analysis of the average or median value of the observed RSS may for instance comprise comparing the determined average or median value for each respective fingerprint of the plurality of fingerprints to each other and/or checking the determined average or median value for each respective fingerprint of the plurality of fingerprints against a threshold.

For instance, for ensuring that a certain average or median value is reached, the determined average or median value may for instance be compared with the threshold. In this way, a certain level of RSS may be ensured. Having a pre-defined or determined according to pre-defined rules level of RSS in the venue enhances indoor positioning and/or floor detection. Further, the more variability there is, the more unique a pattern of the RSS may be. Alternatively or additionally, the analysis of the average or median value of the observed RSS may for instance comprise determining the variability of RSS for each of the plurality of fingerprints.

Further, in case the value of the average or median signal strength is low, it may for instance be assumed that on average there cannot be much variability in the RSS.

In case a fingerprint does not comprise the RSS for one or more radio nodes, the RSS may for instance be determined (e.g. calculated) based at least partially on the horizontal position represented by the piece of position information comprised by the fingerprint, and the identifier of the one or more radio nodes, based on which the horizontal position of the one or more radio nodes can be determined, and further based on a channel propagation model the received signal strengths may be determined.

According to an exemplary embodiment, the second metric is determined based at least partially on a distribution analysis of one or more received signal strengths comprised by each fingerprint, wherein each of the one or more received signal strengths is compared to each other.

By comparing each of the one or more received signal strengths of one or more radio nodes, wherein for each of the one or more radio nodes a signal is receivable at the horizontal position in the venue represented by the piece of position information of the respective fingerprint, the distribution of the one or more radio nodes may for instance be assumed. For instance, it may not be sufficient to have one or two relatively high values of RSS of one or two radio nodes, if the received signal strengths of the other radio nodes is e.g. very low. In such a case, the variability is low and indoor positioning and/or floor detection performance may be not optimal resulting in not very accurate indoor positioning and/or floor detection. Thus, the quality of the infrastructure may for instance be evaluated better in case the distribution analysis shows that there are multiple radio nodes from which the RSS is high.

According to an exemplary embodiment, the second metric is determined at least partially based on a distribution analysis of gradients of one or more received signal strengths, wherein the distribution analysis of gradients comprises checking the one or more received signal strengths of one or more radio nodes associated with one or more fingerprints of adjacent locations represented by the piece of position information of the respective fingerprints for RSS variability.

The quality of the infrastructure (e.g. of an area of the venue) may for instance be evaluated better (e.g. high) in case the higher the received signal strength variability is from horizontal position to horizontal position (also referred to as from point-to-point). In such a case, the adjacent horizontal positions may for instance have more unique RSS patterns. Then, the horizontal positions may for instance be distinguished from each other more reliably. For instance, noise measurements may be used to distinguish the horizontal locations from each other. The more easily horizontal positions may be distinguished from each other, the better the performance of indoor positioning and/or floor detection is. Thus, the quality of the infrastructure may be evaluated better (e.g. with "high") in case the variability of received signal strengths is high from horizontal position to horizontal position of the venue.

According to an exemplary embodiment, the third metric is outputted for usage as a visualization in a radiomap, wherein the visualization represents the evaluation of the obtained plurality of fingerprints with respect to each respective position information.

The radiomap may for instance represent a map of a venue, or at least a part (e.g. region or area) of the radiomap of the venue. These parts of the map of the venue may for instance be parts of a larger radiomap. These parts may for instance pertain to different venue, or one or more different floors of a venue. The map of the venue may have been divided, e.g. by a regular grid (the parts of the venue may then for instance be (e.g. quadratic) tiles). The radiomap as used herein refers to a map (e.g. of the venue) comprising fingerprints associated to a plurality of horizontal positions of the map. Based on a comparison of the fingerprints associated with the radiomap and an obtained fingerprint, indoor positioning and/or floor detection may be performed.

The radiomap may for instance be available to the electronic device by being stored in or at the electronic device, or by being accessible by the electronic device, e.g. via a wireless or wire-bound connection e.g. to an apparatus that stores the radiomaps. This apparatus may be remote from the electronic device or may be included with the electronic device into one device.

In an exemplary embodiment of a method according to the first aspect, the third metric may for instance be visualized and be overlaid with a graphical representation of map data. The visualization of the third metric may for instance be indicative of the quality of fingerprints and/or the quality of the infrastructure of the venue.

The visualization may for instance be used to suggest to the user whether or not enough fingerprints for the venue are gathered in order to perform accurate indoor positioning and/or floor detection. Further, the visualization may for instance be used to suggest to the user whether or not the coverage of one or more areas of the venue for which fingerprints are gathered and the density of the gathered fingerprints is high enough. Further, the visualization may for instance be used to suggest to the user—even if the coverage of areas of the venue for which fingerprints are gathered and the density of the gathered fingerprints is high enough—that the indoor positioning performance and/or floor detection performance may not be high, since the venue does not have enough radio nodes (e.g. beacons and/or Wi-Fi Access points) comprised by its infrastructure to support accurate indoor positioning and/or floor detection.

According to an exemplary embodiment, the visualization comprises an indication to one or more areas of the venue where additional one or more fingerprints need to be obtained and/or where the infrastructure need to be expanded.

The visualization may for example guide a user to one or more areas of the venue, where in order to achieve accurate indoor positioning and/or floor detection, the quality of the infrastructure and/or the quality of an obtained plurality of fingerprints need to be enhanced. For instance, based on the third metric, one or more areas of the venue having e.g. an infrastructure of low quality may be identified. In these one or more areas additional radio nodes may for instance be added in order to enhance the quality of the infrastructure in the one or more areas. For instance, based on the third metric, one or more areas of the venue in which the quality of an obtained plurality of fingerprints is low, said quality of the obtained plurality of fingerprints may for instance be enhanced by obtaining additional one or more fingerprints. Based on the obtained plurality of fingerprints, indoor positioning and/or floor detection can be performed.

According to an exemplary embodiment, the infrastructure is expandable by adding one or more radio nodes to the infrastructure of the venue.

According to an exemplary embodiment, the visualization is overlaid on a graphical representation of the radiomap.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
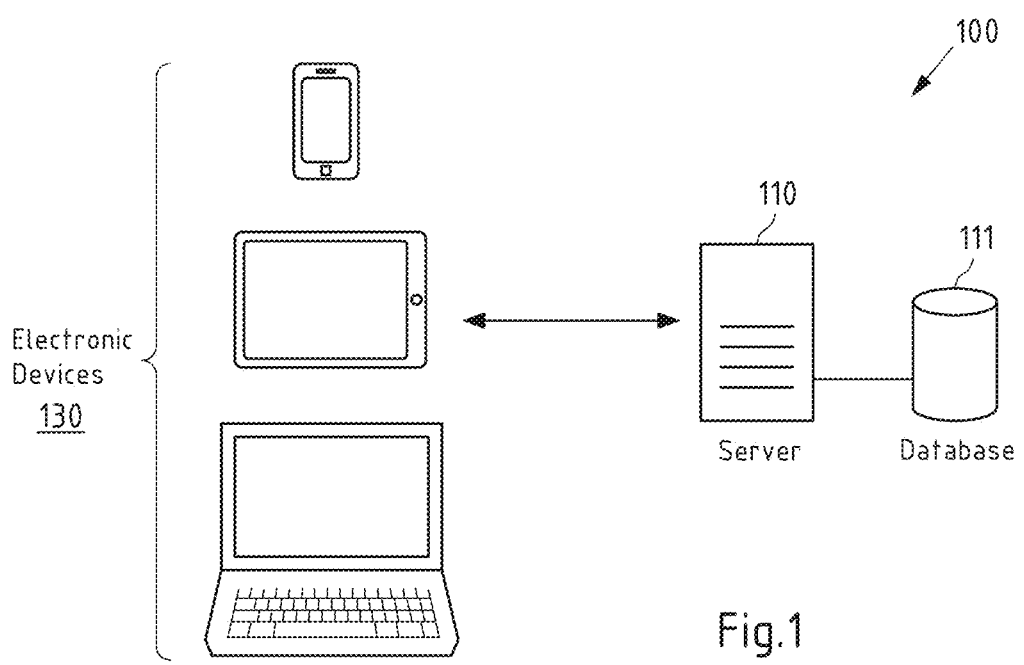
FIG. 1 a schematic block diagram of an example embodiment of a system comprising an example apparatus.

FIG. 1 is a schematic high-level block diagram of an example embodiment of a system.

System 100 comprises a server 110, which may alternatively embodied as a server cloud (e.g. a plurality of servers connected e.g. via the Internet and providing services at least partially jointly), a database 120, and an electronic device 130, of which three different realizations are exemplarily shown: a mobile phone, a tablet, and a portable computer.

According to embodiments, electronic device 130 gathers a plurality of fingerprints inside a venue from an infrastructure comprising one or more radio nodes of the venue. These fingerprints are obtained by server 110, and may for instance be stored in the database 120. Server 110 determines a first metric and a second metric based at least partially on the obtained plurality of fingerprints. Based at least partially on the determined first metric and the determined second metric, a third metric is determined being indicative of an overall evaluation of the quality of the obtained fingerprints of the venue and of the quality of the infrastructure of the venue. The overall evaluation may for instance comprise values being indicative of the quality of the obtained fingerprints of the venue and of the quality of the infrastructure of the venue for one or more areas of the venue, in which one or more areas the venue may be divided. By dividing the venue in one or more areas, and by determining an evaluation for each of the one or more areas of the venue, a user may for instance be provided with a suggestion what actions might be necessary in order for enhancing or providing accurate indoor positioning and/or floor detection within the venue.

Communication between electronic device 130 and server 110 may for instance take place at least partially in a wireless fashion, e.g. based on cellular radio communication or on Wireless Local Area Network (WLAN), or on Bluetooth based communication, to name but a few non-limiting examples. In this way, mobility of electronic device 130 is guaranteed.

Figure 2:
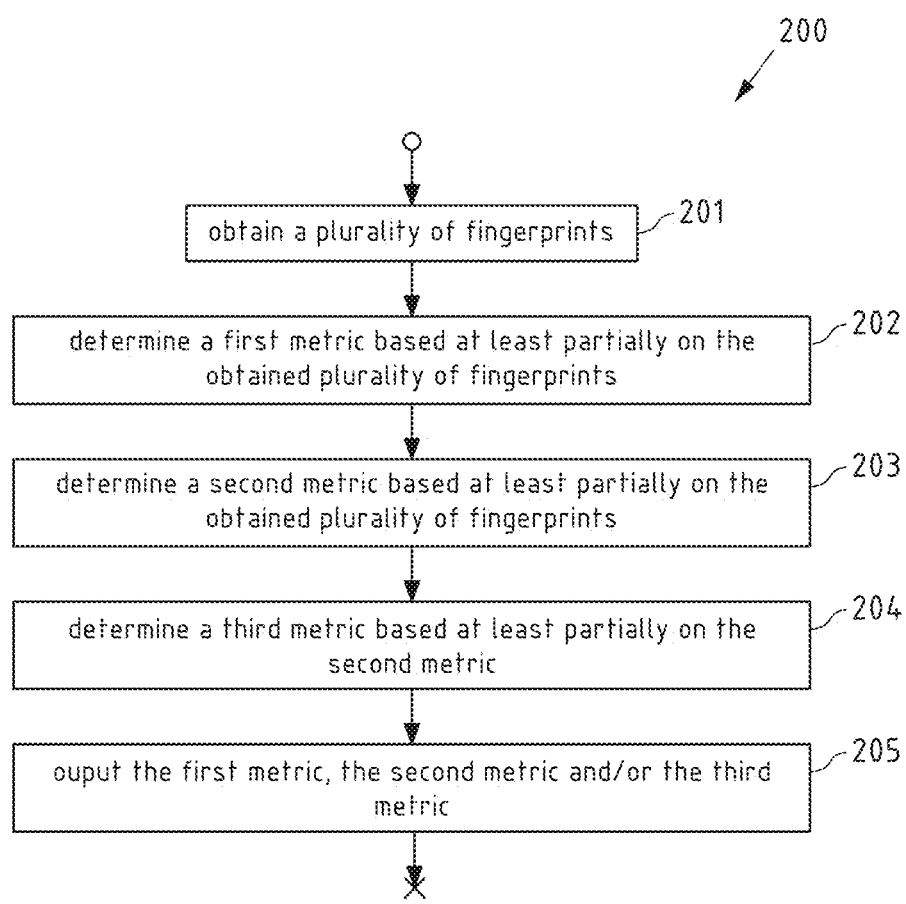
FIG. 2 a flow chart illustrating an example operation, e.g. in the at least one apparatus of FIG. 4, of an example method.
Figure 4:
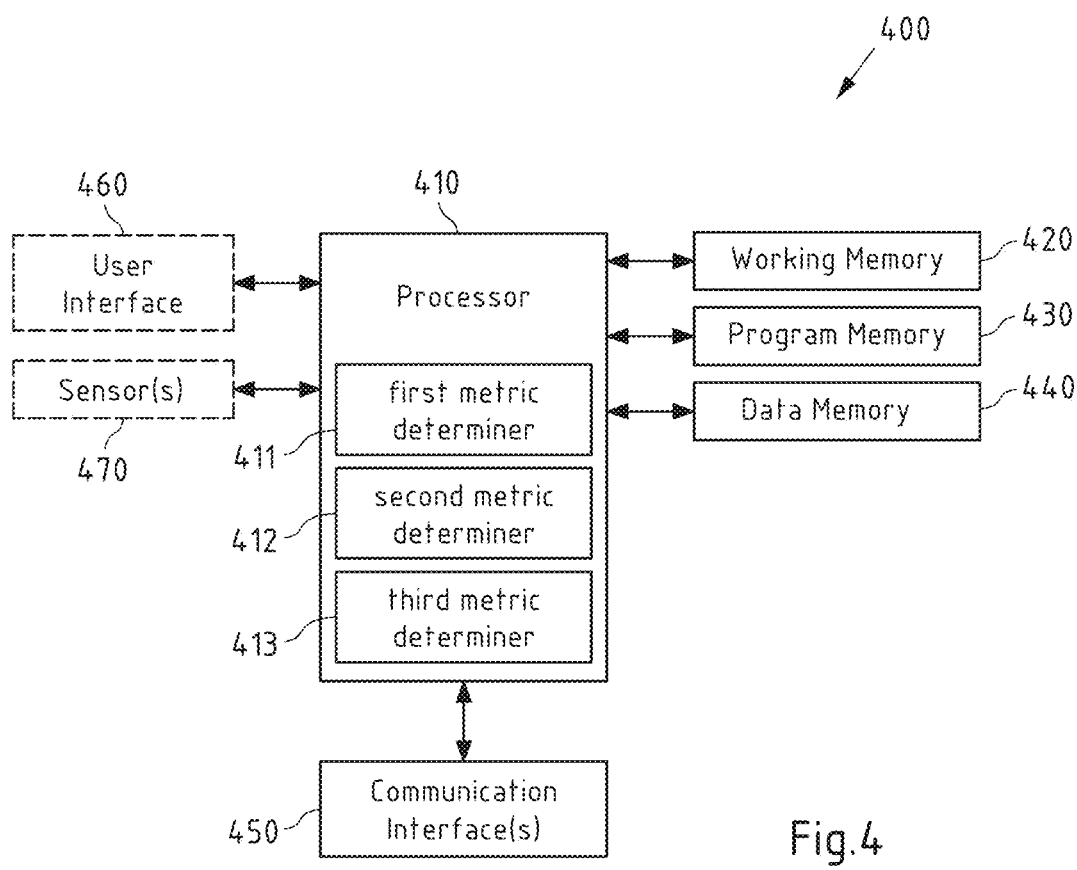
FIG. 4 a schematic block diagram of an example embodiment of an apparatus.

FIG. 2 shows a flow chart illustrating an example operation, e.g. in the at least one apparatus of FIG. 4, of an example method. Flow chart 200 may for instance be performed by server 110 of FIG. 1.

In step 201, a plurality of fingerprints are obtained, e.g. by server 110 of FIG. 1. The plurality of fingerprints are obtained e.g. by receiving the plurality of fingerprints from an electronic device (e.g. electronic device 130 of FIG. 1) from another entity (not shown in FIG. 1) that transmits the plurality of fingerprints to the server, or the plurality of fingerprints are obtained of a memory (e.g. database 120 of FIG. 1), wherein the plurality of fingerprints are stored in the memory.

In step 202, a first metric is determined based at least partially on the obtained plurality of fingerprints. The first metric is determined, e.g. by server 110 of FIG. 1. The determined first metric may then for instance be stored in a memory, e.g. database 120 of FIG. 1.

In step 203, a second metric is determined based at least partially on the obtained plurality of fingerprints. The second metric is determined, e.g. by server 110 of FIG. 1.

The determined second metric may then for instance be stored in a memory, e.g. database 120 of FIG. 1.

In step 204, a third metric is determined based at least partially on the determined the determined second metric, in particular the third metric is determined based at least partially on the determined first metric and the determined second metric. The third metric is determined, e.g. by server 110 of FIG. 1. The determined third metric may then for instance be stored in a memory, e.g. database 120 of FIG. 1.

In step 205, the determined first metric, the second metric and/or the third metric is output. At least one of the determined metrics is output, e.g. to electronic device 130 of FIG. 1. At least one of the determined metrics is output, e.g. by transmitting the at least one metric to an electronic device (e.g. electronic device 130 of FIG. 1), e.g. from server 110 of FIG. 1, or from another entity (not shown in FIG. 1) that transmits the at least one metric to the electronic device. Optionally, prior to outputting at least one of the determined metrics to electronic device, the at least one metric is obtained of a memory (e.g. database 120 of FIG. 1), wherein the determined third metric is stored in the memory. In particular, the determined first metric and the determined third metric are output. For instance, the outputted first metric may for instance be for usage as a visualization in a radiomap, wherein the visualization represents the evaluation of the obtained plurality of fingerprints with respect to the position information. Further, the outputted third metric may for instance be for usage as another visualization in a radiomap, wherein, the visualization represents the evaluation of the infrastructure of the venue with respect to the position information. In particular, the outputted third metric may for instance be used as a visualization on top the visualization of the outputted first metric.

The exemplary flow chart 200 of FIG. 2 may for instance comprise one or more of the further features described above, for instance performing a fingerprint density analysis for determining the first metric. Further, the exemplary flow chart 200 of FIG. 2 may for instance comprise one or more further features described in this specification, for instance a check whether or not the quality of an infrastructure for which the plurality of fingerprints are obtained is high according to the determined second metric, and depending on the outcome of this check, determining the first metric subsequently.

Furthermore, steps 202 and 203 may be performed either serial (as shown in FIG. 2) or in parallel. Alternatively, step 203 may be performed prior to step 202.

Figure 3:
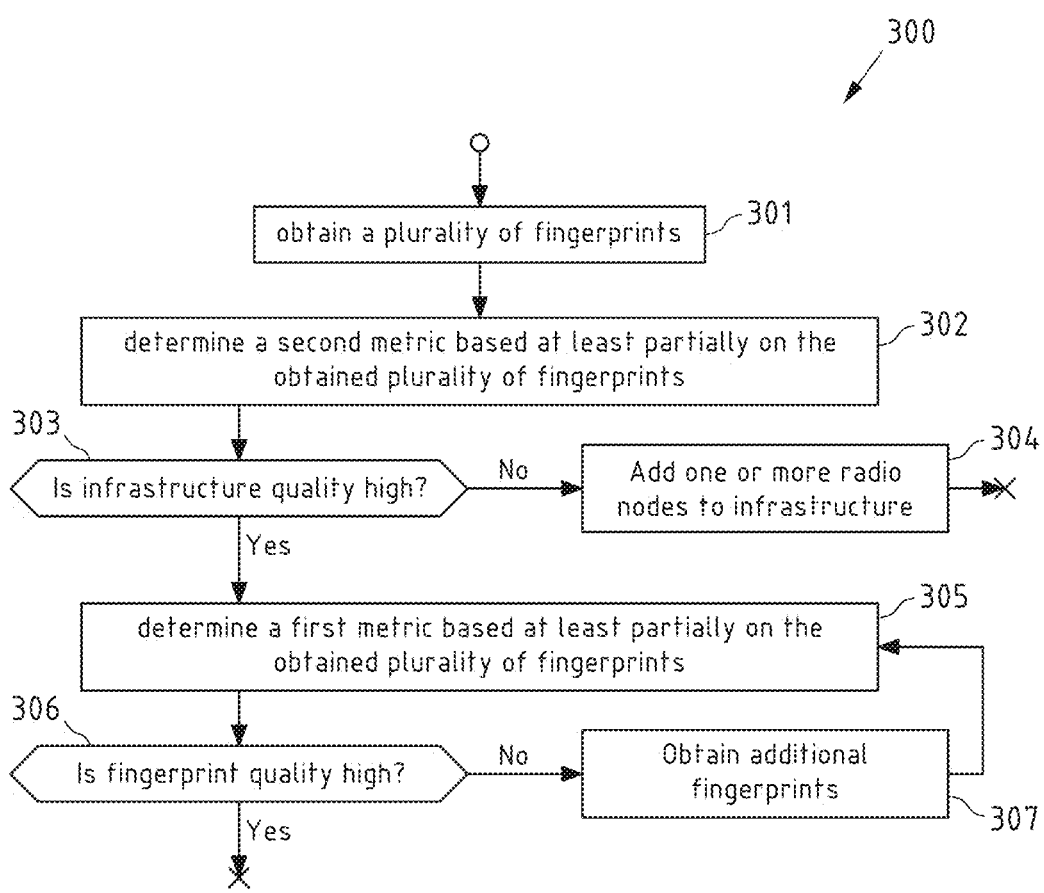
FIG. 3 a schematic flow chart of an example embodiment of a method.

FIG. 3 shows a schematic flow chart of an example embodiment of a method.

In step 301, a plurality of fingerprints are obtained (see step 201 of FIG. 1).

In step 302, a second metric is determined based at least partially on the obtained plurality of fingerprints. The second metric is indicative of a quality value of an infrastructure of a venue (e.g. a building, or a floor of a building like a shopping mall). Based on the obtained plurality of fingerprints, which are gathered e.g. by an electronic device (e.g. electronic device 130 of FIG. 1) by a measurement of signals transmitted from one or more radio nodes comprised by the infrastructure of the venue, the quality of said infrastructure may be evaluated and the second metric is determined accordingly.

In step 303, it is checked whether or not the quality of the infrastructure is high. In case the quality of the infrastructure of the venue is not sufficient (e.g. low, or not high), it may be suggested to a user—the user may for instance be the individual performing the gathering of a plurality of fingerprints for a venue, based on which gathered plurality of fingerprints indoor positioning and/or floor detection may be performed—to add one or more radio nodes to the infrastructure, as indicated by step 304. Thus, it may be suggested to the user what kind of corrective actions the user needs to take. In this way, a highly user friendly usability can be achieved.

In case, the quality of the infrastructure of the venue is sufficient (e.g. high), it may be proceeded with step 305. In step 305, a first metric is determined based at least partially on the obtained plurality of fingerprints. The first metric is indicative of a quality value of the obtained plurality of fingerprints, e.g. whether or not enough fingerprints are obtained for (an area of) the venue.

In step 306, it is checked whether or not the quality of the obtained plurality of fingerprints is high. In case the quality of the obtained plurality of fingerprints is not sufficient (e.g. low, or not high), for instance because the density of fingerprints associated with an area of the venue is not high enough, it may be suggested to the user to obtain additional one or more fingerprints (for the affected area of the venue), as indicated by step 307. Further, as indicated by the arrow pointing back from step 307 to step 305, after obtaining additional one or more fingerprints, the first metric may for instance be determined again in order to check whether or not now—after additional one or more fingerprints for (an area of) the venue are obtained—the quality of the obtained plurality of fingerprints is sufficient.

In case the quality of the obtained plurality of fingerprints is sufficient (e.g. high), it is determined that for (an area of) the venue i) the quality of the infrastructure, and ii) the quality of the obtained plurality of fingerprints is sufficient so that accurate and high performance of indoor positioning and/or floor detection is supported.

In comparison to the flow chart 200 of FIG. 2, in flow chart 300 of FIG. 3 the second metric is determined in step 302 prior to determining the first metric in step 305. This may be done, since the second metric is more primary than the first metric. The infrastructure may be needed to be secured first in (an area of) a venue and only then a plurality of fingerprints in a high quality should be obtained. In order to check whether or not the quality of the infrastructure of a venue is high, at least some fingerprints need to be obtained, indicated by step 301. In case e.g. additional radio nodes are added to the infrastructure of the venue, previously obtained fingerprints may for instance be obsolete, since the adding of additional one or more fingerprints changes the fingerprints which can be gathered in (one or more areas of) the venue in which one or more additional radio nodes are added. In this case, a "new" plurality of fingerprints may be obtained.

FIG. 4 is a schematic block diagram of an apparatus 400 according to an exemplary aspect, which may for instance represent the electronic device 130 of FIG. 1. Alternatively, the schematic block diagram of the apparatus 300 according to an exemplary aspect may for instance represent server 110 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to exemplary aspects.

Processor 410 may for instance comprise a first metric determiner 411 as a functional and/or structural unit. First metric determiner 411 may for instance be configured to determine a first metric (see step 202 of FIG. 2). Processor 410 may for instance comprise a second metric determiner 412 as a functional and/or structural unit. Second metric determiner 411 may for instance be configured to determine a lane distance metric (see step 203 of FIG. 2). Processor 410 may for instance comprise a third metric determiner 413 as a functional and/or structural unit. Third metric determiner 413 may for instance be configured to determine a vehicle lane pattern metric (see step 204 of FIG. 2). Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store data, e.g. map data. Data may for instance represent at least one link associated with a road segment of at least one road segment. Data may comprise one or more sets of data, each set of data comprising one or more representatives of at least one link associated with a road segment of at least one road segment.

Communication interface(s) 450 enable apparatus 400 to communicate with other entities, e.g. with server 110 of FIG. 1. The communication interface(s) 450 may for instance comprise a wireless interface, e.g. a cellular radio communication interface and/or a WLAN interface) and/or wirebound interface, e.g. an IP-based interface, for instance to communicate with entities via the Internet. Communication interface(s) may enable apparatus 400 to communicate with other entities, for instance with server 110 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information.

Some or all of the components of the apparatus 400 may for instance be connected via a bus. Some or all of the components of the apparatus 400 may for instance be combined into one or more modules.

Figure 5:
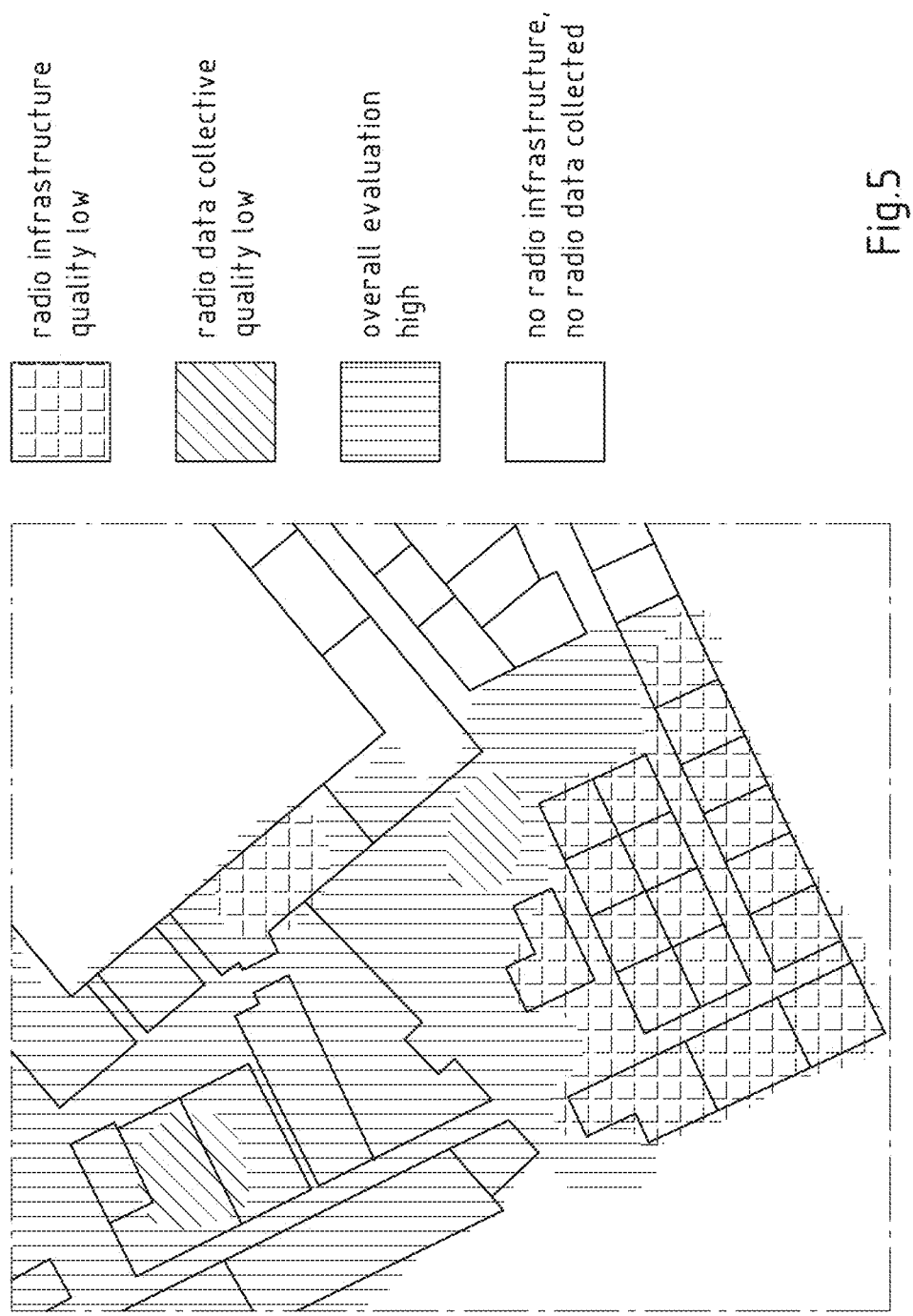
FIG. 5 depicts a sample visualization of a third metric determined according to an exemplary embodiment of a method.

FIG. 5 depicts a sample visualization of a third metric determined according to an exemplary embodiment of a method.

In FIG. 5 an example of a visualization of a third metric showing a quality of fingerprints and a quality of infrastructure for a venue is shown. The venue is depicted by a map of the inside of the venue. Further, the map of the venue is overlaid with the visualization of the third metric. For instance, the upper left area of the venue illustrated in FIG. 5 is overlaid by a hatched area with vertical lines indicating that the overall evaluation is high. Thus, in said area, enough radio nodes are comprised by the infrastructure and enough fingerprints are obtained so that in said area accurate indoor positioning and/or floor detection is supported.

The area indicated by the visualization of an area filled with L-shaped patterns of the third metric (illustrated in the middle of FIG. 5 and illustrated in the lower part of FIG. 5) relates to areas of the venue, in which the quality of the infrastructure is low. Thus, in said areas, not enough radio nodes are comprised by the infrastructure. In order to support accurate indoor positioning and/or floor detection, additional radio nodes may be added. The evaluation of said areas indicated by the area filled with L-shaped patterns visualization and the associated overall evaluation being low will still be evaluated low even if enough fingerprints are obtained for said areas.

The area of the venue located on the right of FIG. 5, in which no visualization is overlaid on the map of the venue indicates an area, in which no fingerprints are obtained.

The area located directly to the left of the area, in which no fingerprints are obtained, is overlaid by a visualization of a hatched area with diagonal lines. This visualization of a hatched area with diagonal lines indicates that enough radio nodes are comprised by said area, but not enough fingerprints are obtained. Thus, further fingerprints in said area may be obtained for said area to support sufficient indoor positioning and/or floor detection performance.

Figure 6:
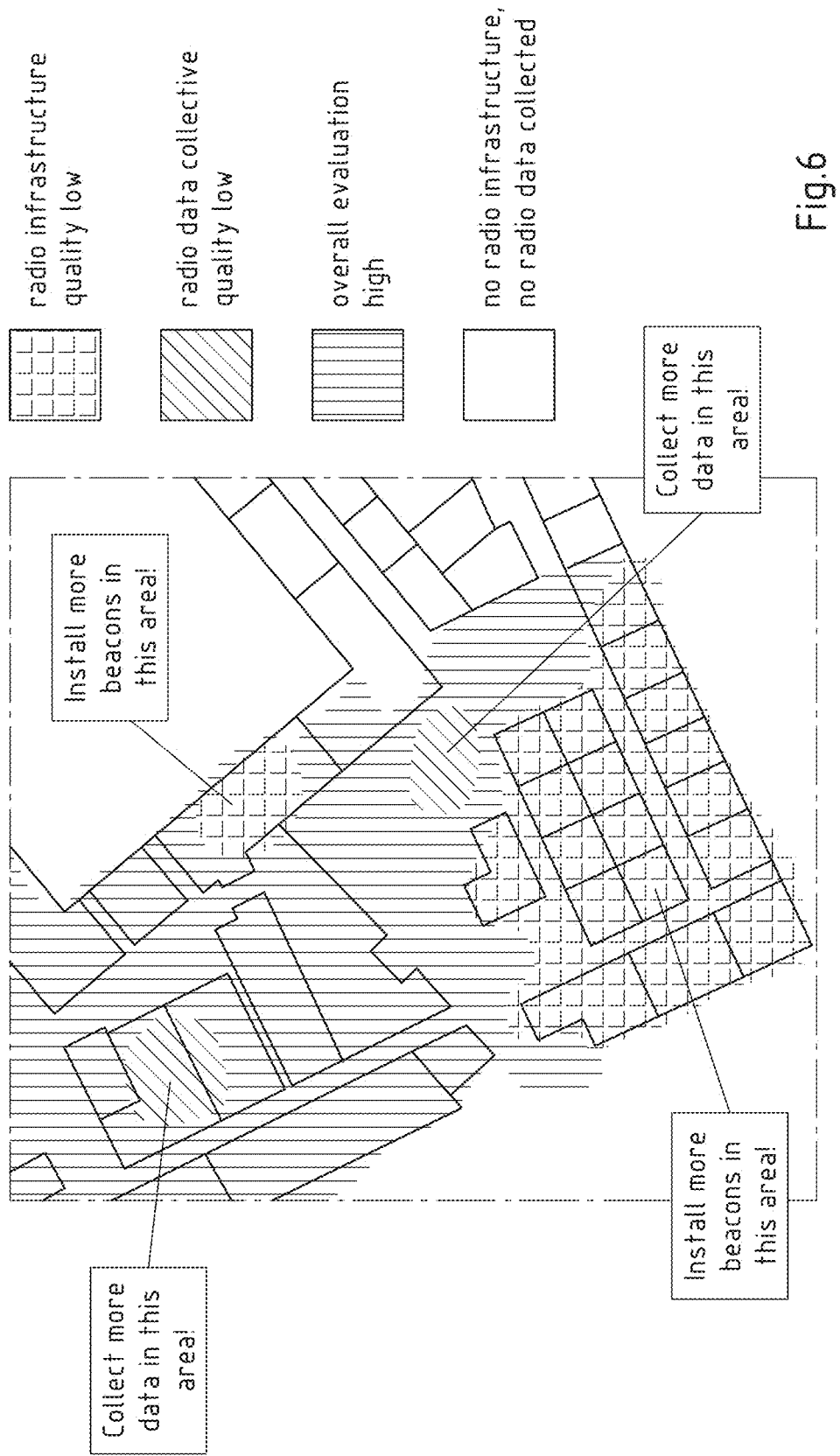
FIG. 6 depicts a sample visualization of a third metric determined according to an exemplary embodiment of a method.

FIG. 6 depicts a sample visualization of a third metric determined according to an exemplary embodiment of a method.

In contrast to the visualization shown in FIG. 5, the visualization of FIG. 6 comprises explicit suggestions to a user for achieving accurate indoor positioning and/or floor detection. FIG. 6 shows the same map of the venue as FIG. 5. For instance, in the upper left corner, there is overlaid a visualization indicating that additional one or more fingerprints need to be obtained in said area ("Collect more data in this area!").

Further, the area of the venue located in the middle of FIG. 6 is overlaid with a visualization indicating that more radio nodes should be added to the infrastructure of said area ("Install more beacons in this area!").

In this way, a user may be provided with all information he needs in order to provide a venue with i) the infrastructure; and for performing indoor positioning and/or floor detection with ii) fingerprints obtained for the venue.

The following embodiments shall also be considered to be disclosed:

It is proposed to visualize the overall data quality in a single combined view and guide user actions based on the quality view. The overall quality may for instance have two components:
  i) Data collection sufficiency, for instance sample density and coverage; this may for instance follow from the amount labor invested to the data collection;
  ii) Infrastructure quality, for instance the quality of the radio signal environment in the venue (e.g. building); this may for instance follow directly from the number of radio nodes and their geometry within the venue (e.g. building).

These two metrics may for instance be evaluated separately and/or be combined, e.g. as described in the table below for easy-to-interpret form for the user:

|  |  | Infrastructure Quality | |
|---|---|---|---|
|  |  | Low | High |
| Data Collection Sufficiency | Low | Add more radio nodes in the affected areas and collect radio data in those areas after the installation. | Collect more radio data in the affected areas to increase data collection quality. |
|  | High | Add more radio nodes in the affected areas and collect radio data in those areas after the installation. | High overall quality. No actions needed. |

The underlying principle is that when the both metrics are high, the overall quality is high. However, of one or both metrics are low, the user must take an action—and the action to be taken may for instance depend on which one of the two metrics is low. Specifically, if the radio infrastructure quality is low, more radio nodes (beacons or Wi-Fi Access Points, to name but a few non-limiting examples) need to be installed in the venue (e.g. building) after which data needs to be collected in the area. However, if the radio data collection quality is low, the user can easily correct the situation by collecting more radio data with the data collection tool.

Importantly, the radio infrastructure quality is considered as a more primary metric, because unless radio infrastructure is adequate, no amount of data collection can make the positioning quality high.

Further, it may be noted that when radio data collection is high, but the infrastructure quality is low, the installation of the radio nodes in the area will initially also decrease the radio data collection quality, because the radio data for the new radio nodes is not captured yet. However, as more radio data is collected, the overall quality will eventually be high.

FIG. 5 shows an exemplary radio map as used in a method according to the first aspect comprising a quality view of radio data collection.

Several observations may be made:
i) The overall quality is high in the upper left corner of the indoor map: the area has been covered well with the samples and the radio infrastructure quality is high there;
ii) There is a small area in the middle and large area at the lower left corner, which show low radio infrastructure quality. The infrastructure quality can only be improved by installing more beacons in the area. After that, further or new radio data collection is required in that area;
iii) The rightmost part of the building is still uncovered and thus nothing can be said about the quality, e.g. of the infrastructure;
iv) More radio data collection is required in the hatched areas with diagonal lines. However, radio infrastructure is fine there.

FIG. 6 shows an exemplary visualization of an exemplary user interface as used in a method according to the first aspect.

The shown user interface may for instance suggest to the user, what kind of corrective actions the user may need to take. In this way, the tool may be made user friendly: in the end the user needs to understand neither the data collection requirements nor radio infrastructure requirements. It suffices to walk around with the tool, which than informs the user about the quality and corrective actions.

Further, the following embodiments with respect to the workflow of exemplary aspects shall also be considered to be disclosed:

Nothing about the quality may be determined before some radio data has been collected from the venue (e.g. building). This is because the system cannot know about the quality of the radio infrastructure before samples have been obtained of the radio environment. Therefore, with this type of quality mechanism, the suggested work flow may be as follows:

i) Walk around the venue (e.g. building) along main corridors and large halls with the tool to get feedback on the radio infrastructure quality: in case there are areas in which the radio quality is low, those areas will be indicated with e.g. an area filled with L-shaped patterns. The areas, in which the radio infrastructure quality is good, would be shown e.g. with a hatched area with diagonal lines, because after the single pass along the corridors and halls the data collection quality is low. The reasoning for just walking around the building in this way is that it would be useless to collect radio data densely only to find out that the radio infrastructure quality is bad.

ii) The areas showing low radio infrastructure quality (shown in FIG. 6 with areas filled with L-shaped patterns) need more beacons (or Wi-Fi Access Points). Beacons need to be added before collecting more radio data. After installing the additional radio infrastructure, walk around the area showing low radio quality to see, if the radio infrastructure is good now. The affected areas (previously indicated with an area filled with L-shaped patterns) would turn to an hatched area with diagonal lines because the radio infrastructure is now good, but the radio data collection quality is low.

iii) Collect more radio data in the areas shown as hatched areas with diagonal lines, the areas will turn to hatched areas with vertical lines once enough radio data has been collected.

Further, the following embodiments with respect to the metrics of exemplary aspects shall also be considered to be disclosed:

Technically speaking, the usefulness of quality view depends on how well the metrics can really capture the "quality".

The data collection quality (sufficiency) can be a function of these:

i) Sample density:
    if radio data is collected too sparsely, the full behavior of the radio signal cannot be captured. Therefore, enough samples needs to be collected per unit area. However, the quality also saturates: the quality does not improve after certain threshold density.

ii) Similarity of the nearby samples:
    Another important aspect to consider is the similarity between the nearby points. If two nearby points show wildly different set of radio nodes or significantly differing Rx levels, then in that area there is something (e.g. a wall) that causes the radio signals change at high rate. In such area radio data needs to be collected more densely than in other areas to capture the rapid signal strength changes.

The infrastructure quality can be a function of these:

i) Number of radio nodes observed at a point:
    Simply, more radio nodes there are, the better the infrastructure quality and positioning accuracy.

ii) Average or median Rx value:
    In general, it is advantageous to have high Rx levels, because there is room for high variability, which helps positioning—the more variability there is, the more unique the Rx pattern is at a given point and the higher the positioning accuracy. If the average signal strength is low, it means that on average there cannot be much variability in the signal strengths.

iii) Distribution of the Rx values:
    This component relates to the previous item. However, here the distribution of the Rx values may be analyzed and understood. It does not suffice to have one or two very high Rx values, if the rest are very low. In such a case the variability is low and positioning performance will not be too good. Thus, it is advantageous if the distribution shows that there are multiple radio nodes with high signal strength.

iv) Distribution of the Rx gradients:
    The positioning performance is better, the higher the signal strength variability is from point-to-point, because in such a case the nearby points have more unique signal strength patterns. The points may then for instance be distinguished from each other more reliably using noise measurements resulting in higher accuracy.

Further, it may be noted that the radio infrastructure may only be evaluated exactly at the points, where actual data has been collected. However, for the illustrative purposes the quality needs to be indicated also for the nearby areas from which data has not been collected. Then, the quality can be estimated with interpolation/extrapolation methods.

Once the two metrics have been evaluated, the final metric can be qualitatively generated as follows in the table below:

|  |  | Data collection sufficiency | | |
| --- | --- | --- | --- | --- |
|  |  | Low | Medium | High |
| Infra-structure quality | Low | Infra-low | Infra-low | Infra-low |
|  | Medium | Data-low | Medium | Medium |
|  | High | Data-low | Medium | High |

"Infra-low" refers to that the infrastructure quality is low and may be colored, e.g. as a visualization on a radiomap in the color red.

"Data-low" refers to that the data collection sufficiency is low and may be colored, e.g. as a visualization on a radiomap in the color red.

In order to differentiate between "Infra-low" and "Data-low", these two cases may for instance be indicated in a visualization in different ways, e.g. "Infra-low" may be colored, e.g. as a visualization on a radiomap in the color red, and "Data-low" may be colored, e.g. as a visualization on a radiomap (e.g. the radiomap used in the visualization of "Infra-low") in the color light red, to name but one non-limiting example.

"Medium" refers to that additional data collection should be performed for acquiring a sufficient amount of data and may be colored, e.g. as a visualization on a radiomap in the color mild green.

"High" refers to that the infrastructure quality is high and the data collection sufficiency is high and may be colored, e.g. as a visualization on a radiomap in the color dark green.

In case that both metrics are "high" then the overall metric is "high". And in case one or the both metrics are "low", then the overall metric is low. However, in the low end it may for instance be distinguished whether the low metric is due to infrastructure or data collection quality is "low". This is because the corrective actions are different:

i) Low data collection quality→collect more radio data;
ii) Low infrastructure quality→install more beacons and then collect radio data.

Finally, it may not be stressed enough that when giving visual clues, the radio infrastructure quality is more primary than the data collection one. To exemplify, as indicated in the table above, an area of the venue shall be shown primarily in e.g. red, or indicated as an area filled with L-shaped patterns, if needed, because radio infrastructure need to be secured first and only then the data collection sufficiency. Thus, in case the quality of the infrastructure is determined to be low, the area of the venue shall be shown primarily in e.g. red, or indicated as an area filled with L-shaped patterns in the visualization.

In this way, the user gets timely information on the quality of the radio infrastructure and can react accordingly. Processing power requirements for the data analysis may be significant, but due to increasing processing power capabilities of modern devices more accurate indoor positioning and floor detection can be achieved. Anyhow, since the data analysis is regularly performed in a cloud (e.g. server cloud), processing power requirements may not be of further interest.

Further, also the following embodiments shall be considered to be disclosed:

Embodiment 1

An apparatus comprising at least one processor and at least one memory including computer program code, the at least one memory and the computer program code configured to, with the at least one processor, cause the apparatus to at least perform:
 obtaining a plurality of fingerprints, wherein each fingerprint comprises a piece of position information, and wherein each fingerprint is gathered in a venue;
 determining a first metric based at least partially on the obtained plurality of fingerprints, wherein the first metric is indicative of a quality value of the obtained plurality of fingerprints, wherein the first metric indicates for each piece of position information of the plurality of fingerprints whether or not the quality and/or a quantity of the obtained fingerprints with respect to the piece of position information is sufficient;
 determining a second metric based at least partially on the obtained plurality of fingerprints, wherein the second metric is indicative of a quality value of an infrastructure of the venue, wherein the plurality of fingerprints are gathered from one or more radio nodes comprised by the infrastructure, and wherein the second metric indicates for each of the pieces of position information of each of the respective fingerprints whether or not the quality of the infrastructure is sufficient;
 determining a third metric indicative of an evaluation of the quality of the infrastructure of the venue based at least partially on the second metric; and
 outputting the first metric, the second metric and/or the third metric.

Embodiment 2

The apparatus according to embodiment 1, wherein the determined third metric is indicative of an evaluation of the quality of the obtained plurality of fingerprints and the quality of the infrastructure, and wherein the third metric is determined based at least partially on the first metric and on the second metric.

Embodiment 3

The apparatus according to any of the preceding embodiments, wherein the quality value of the obtained plurality of fingerprints and/or the quality value of the infrastructure of the venue represent one of the following states i) to iii):
 i) infrastructure quality and/or fingerprint quality is low;
 ii) infrastructure quality and/or fingerprint quality is medium;
 iii) infrastructure quality and/or fingerprint quality is high.

Embodiment 4

The apparatus according to any of the preceding embodiments, wherein in case the second metric is indicative of the state i) represented by a quality value indicative of the infrastructure quality is low, the third metric is determined to represent an overall low quality state, independent of whether or not the first metric is indicative of that the data collection quality is sufficient.

Embodiment 5

The apparatus according to any of the preceding embodiments, wherein in case the first metric indicates that the quality of the obtained plurality of fingerprints with respect to the position information is not sufficient, at least a part of the outputted first metric represents that additional one or more fingerprints need to be obtained.

Embodiment 6

The apparatus according to any of the preceding embodiments, wherein in case the second metric indicates that the quality of the infrastructure is not sufficient, at least a part of the outputted second metric and/or outputted third metric represents that the infrastructure needs to be expanded, and after the expansion, additional one or more fingerprints need to be obtained.

Embodiment 7

The apparatus according to any of the preceding embodiments, wherein the first metric is determined based at least partially on a fingerprint density analysis, wherein the fingerprint density analysis comprises analyzing how many fingerprints of the plurality of fingerprints are associated with an area of the venue.

Embodiment 8

The apparatus according to any of the preceding embodiments, wherein the first metric is determined based at least partially on a similarity of nearby fingerprints analysis, wherein the similarity of nearby fingerprints analysis comprises analyzing whether or not at least two fingerprints associated with an area of the venue comprise at least similar identifiers of one or more radio nodes.

Embodiment 9

The apparatus according to any of the preceding embodiments, wherein the second metric is determined based at least partially on a number of radio nodes associated with the position information comprised by each of the plurality of fingerprints.

Embodiment 10

The apparatus according to any of the preceding embodiments, wherein the second metric is determined based at least partially on an average or a median value of one or more received signal strengths, wherein the average or the median value is calculated based on each of the one or more received signal strengths of the one or more radio nodes of each respective fingerprint.

Embodiment 11

The apparatus according to embodiment 9, wherein the second metric is determined at least partially based on a distribution analysis of one or more received signal strengths comprised by each fingerprint, wherein each of the one or more received signal strengths is compared to each other.

Embodiment 12

The apparatus according to any of the preceding embodiments, wherein the second metric is determined at least partially based on a distribution analysis of gradients of one or more received signal strengths, wherein the distribution analysis of gradients comprises checking the one or more received signal strengths of one or more radio nodes associated with one or more fingerprints of adjacent locations represented by the piece of position information of the respective fingerprints for received signal strength variability.

Embodiment 13

The apparatus according to any of the preceding embodiments, wherein the third metric is outputted for usage as a visualization in a radiomap, wherein the visualization represents the evaluation of the obtained plurality of fingerprints with respect to the position information.

Embodiment 14

The apparatus according to embodiment 13, wherein the visualization comprises an indication to one or more locations in the venue where additional one or more fingerprints need to be obtained and/or where the infrastructure need to be expanded.

Embodiment 15

The apparatus according to any of the embodiments 13 or 14, wherein the visualization is overlayed on a graphical representation of the radiomap.

Embodiment 16

The apparatus according to any of the embodiments 6 to 15, wherein the infrastructure is expandable by adding one or more radio nodes to the infrastructure of the venue.

Embodiment 17

A method, in particular performed and/or controlled by at least one apparatus, the method comprising:
  obtaining a plurality of fingerprints, wherein each fingerprint comprises a piece of position information, and wherein each fingerprint is gathered in a venue;
  determining a first metric based at least partially on the obtained plurality of fingerprints, wherein the first metric is indicative of a quality value of the obtained plurality of fingerprints, wherein the first metric indicates for each piece of position information of the plurality of fingerprints whether or not the quality and/or a quantity of the obtained fingerprints with respect to the piece of position information is sufficient;
  determining a second metric based at least partially on the obtained plurality of fingerprints, wherein the second metric is indicative of a quality value of an infrastructure of the venue, wherein the plurality of fingerprints are gathered from one or more radio nodes comprised by the infrastructure, and wherein the second metric indicates for each of the pieces of position information of each of the respective fingerprints whether or not the quality of the infrastructure is sufficient;
  determining a third metric indicative of an evaluation of the quality of the infrastructure of the venue based at least partially on the second metric; and
  outputting the first metric, the second metric, and/or the third metric.

Embodiment 18

The apparatus according to embodiment 17, wherein the determined third metric is indicative of an evaluation of the quality of the obtained plurality of fingerprints and the quality of the infrastructure, and wherein the third metric is determined based at least partially on the first metric and on the second metric.

Embodiment 19

The method according to embodiment 17 or embodiment 18, wherein the quality value of the obtained plurality of fingerprints and/or the quality value of the infrastructure of the venue represent one of the following states i) to iii):
i) infrastructure quality and/or fingerprint quality is low;
ii) infrastructure quality and/or fingerprint quality is medium;
iii) infrastructure quality and/or fingerprint quality is high.

Embodiment 20

The method according to any of the preceding embodiments, wherein in case the second metric is indicative of the state i) represented by a quality value indicative of the infrastructure quality is low, the third metric is determined to represent an overall low quality state, independent of whether or not the first metric is indicative of that the data collection quality is sufficient.

Embodiment 21

The method according to any of the preceding embodiments, wherein in case the first metric indicates that the quality of the obtained plurality of fingerprints with respect to the position information is not sufficient, at least a part of the outputted first metric represents that additional one or more fingerprints need to be obtained.

Embodiment 22

The method according to any of the preceding embodiments, wherein in case the second metric indicates that the quality of the infrastructure is not sufficient, at least a part of the outputted second metric and/or outputted third metric represents that the infrastructure needs to be expanded, and after the expansion, additional one or more fingerprints need to be obtained.

Embodiment 23

The method according to any of the preceding embodiments, wherein the first metric is determined based at least partially on a fingerprint density analysis, wherein the fingerprint density analysis comprises analyzing how many fingerprints of the plurality of fingerprints are associated with an area of the venue.

Embodiment 24

The method according to any of the preceding embodiments, wherein the first metric is determined based at least partially on a similarity of nearby fingerprints analysis, wherein the similarity of nearby fingerprints analysis comprises analyzing whether or not at least two fingerprints associated with an area of the venue comprise at least similar identifiers of one or more radio nodes.

Embodiment 25

The method according to any of the preceding embodiments, wherein the second metric is determined based at least partially on a number of radio nodes associated with the position information comprised by each of the plurality of fingerprints.

Embodiment 26

The method according to any of the preceding embodiments, wherein the second metric is determined based at least partially on an average or a median value of one or more received signal strengths, wherein the average or the median value is calculated based on each of the one or more received signal strengths of the one or more radio nodes of each respective fingerprint.

Embodiment 27

The method according to embodiment 26, wherein the second metric is determined at least partially based on a distribution analysis of one or more received signal strengths comprised by each fingerprint, wherein each of the one or more received signal strengths is compared to each other.

Embodiment 28

The method according to any of the preceding embodiments, wherein the second metric is determined at least partially based on a distribution analysis of gradients of one or more received signal strengths, wherein the distribution analysis of gradients comprises checking the one or more received signal strengths of one or more radio nodes associated with one or more fingerprints of adjacent locations represented by the piece of position information of the respective fingerprints for received signal strength variability.

Embodiment 29

The method according to any of the preceding embodiments, wherein the third metric is outputted for usage as a visualization in a radiomap, wherein the visualization represents the evaluation of the obtained plurality of with respect to the position information.

Embodiment 30

The method according to embodiment 29, wherein the visualization comprises an indication to one or more locations in the venue where additional one or more fingerprints need to be obtained and/or where the infrastructure need to be expanded.

Embodiment 31

The method according to any of the embodiments 29 or 30, wherein the visualization is overlayed on a graphical representation of the radiomap.

Embodiment 32

The method according to any of the embodiments 22 to 31, wherein the infrastructure is expandable by adding one or more radio nodes to the infrastructure of the venue.

Embodiment 33

An apparatus configured to perform and/or control or comprising respective means for performing and/or controlling the method of any of the embodiments 17 to 32.

Embodiment 34

A computer program code, the computer program code when executed by a processor causing an apparatus to perform the actions of the method according to any of the embodiments 17 to 32.

Embodiment 35

A computer readable storage medium in which computer program code according to the embodiment 34 is stored.

Embodiment 36

An apparatus comprising at least one processor and at least one memory including computer program code, the at least one memory and the computer program code configured to, with the at least one processor, cause an apparatus at least to perform and/or control the method of any of the embodiments 17 to 32.

Embodiment 37

The apparatus according to embodiment 36, wherein the apparatus is a mobile device or a part thereof, and, in particular, a part of an autonomous vehicle.

Embodiment 38

A system, comprising a first apparatus according to anyone of embodiments 1 to 16, and at least a second apparatus, wherein the second apparatus is configured to provide the at least one probe data to the first apparatus.

Embodiment 39

A system, comprising an apparatus according to any of embodiments 1 to 16, and an electronic device, wherein the electronic device is configured to gather one or more fingerprints.

Embodiment 40

The system according to embodiment 39, wherein the electronic device is configured to provide the one or more fingerprints to the apparatus.

Embodiment 41

A tangible computer-readable medium storing computer program code, the computer program code when executed by a processor causing an apparatus to perform and/or control:
  obtaining a plurality of fingerprints, wherein each fingerprint comprises a piece of position information, and wherein each fingerprint is gathered in a venue;
  determining a first metric based at least partially on the obtained plurality of fingerprints, wherein the first metric is indicative of a quality value of the obtained plurality of fingerprints, wherein the first metric indicates for each piece of position information of the plurality of fingerprints whether or not the quality and/or a quantity of the obtained fingerprints with respect to the piece of position information is sufficient;
  determining a second metric based at least partially on the obtained plurality of fingerprints, wherein the second metric is indicative of a quality value of an infrastructure of the venue, wherein the plurality of fingerprints are gathered from one or more radio nodes comprised by the infrastructure, and wherein the second metric indicates for each of the pieces of position information of each of the respective fingerprints whether or not the quality of the infrastructure is sufficient;
  determining a third metric indicative of an evaluation of the quality of the infrastructure of the venue based at least partially on the second metric; and
  outputting the first metric, the second metric, and/or the third metric.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method comprising:
  receiving, at a mobile device, radio data associated with one or more radio nodes, wherein the received radio data is a candidate to be used for indoor position estimation of the mobile device; and
  outputting, based at least on the received radio data, a visualization that includes a textual expression indicating a suggested action associated with collection of additional radio data, wherein the additional radio data is also a candidate to be used for indoor position estimation, and
  wherein the textual expression indicating the suggested action comprises the textual expression indicating one or more of (i) an area at which the additional radio data should be collected or (ii) an area at which additional infrastructure should be deployed.

2. The method of claim 1, wherein the indoor position estimation includes floor detection.

3. The method of claim 1, wherein the radio data includes position information for at least one of the one or more radio nodes and an identifier for at least one of the one or more radio nodes.

4. The method of claim 1, wherein the radio data includes a received signal strength for at least one of the one or more radio nodes.

5. The method of claim 1, wherein the radio data includes density associated with the radio data.

6. The method of claim 1, wherein the radio data includes a quantity associated with the radio data.

7. The method of claim 1, further comprising:
  evaluating the radio data for performance of an indoor positioning system.

8. The method of claim 7, wherein the evaluation of the radio data includes a distribution analysis of gradients of one or more received signal strengths for variability.

9. The method of claim 1, wherein the one or more radio nodes are in a venue and the suggested action includes an indicator for a location within the venue for the area at which the additional radio data should be collected or the area at which additional infrastructure should be deployed.

10. The method of claim 9, wherein the visualization includes a map of the venue with the suggested action overlaid on the map.

11. An apparatus comprising at least one processor and at least one memory including computer program code, the at least one memory and the computer program code configured to, with the at least one processor, cause the apparatus to at least perform:
  receiving, at a mobile device, radio data associated with one or more radio nodes, wherein the received radio data is a candidate to be used for indoor position estimation of the mobile device; and
  outputting, based at least on the received radio data, a visualization that includes a textual expression indicating a suggested action associated with collection of additional radio data, wherein the additional radio data is also a candidate to be used for indoor position estimation, and
  wherein the textual expression indicating the suggested action comprises the textual expression indicating one or more of (i) an area at which the additional radio data should be collected or (ii) an area at which additional infrastructure should be deployed.

12. The apparatus of claim 11, the at least one memory and the computer program code configured to, with the at least one processor, cause the apparatus to at least perform:
  determining a first quality value for infrastructure of the one or more radio nodes and a second quality for the radio data of the one or more radio nodes.

13. The apparatus of claim 11, wherein the radio data includes position information for the one or more radio nodes and an identifier for the one or more radio nodes.

14. The apparatus of claim 11, wherein the radio data includes received signal strength.

15. The apparatus of claim 11, wherein the radio data includes density of the radio data.

16. The apparatus of claim 11, wherein the radio data includes a quantity of measurements.

17. The apparatus of claim 11, the at least one memory and the computer program code configured to, with the at least one processor, cause the apparatus to at least perform:
  determining a performance of the indoor position estimation using the radio data.

18. The apparatus of claim 11, the at least one memory and the computer program code configured to, with the at least one processor, cause the apparatus to at least perform:
  determining a distribution analysis of gradients of one or more received signal strengths included in the radio data.

19. The apparatus of claim 11, wherein the one or more radio nodes are in a venue and the suggested action includes an indicator for one or more locations with the venue for the area at which the additional radio data should be collected or the area at which additional infrastructure should be deployed.

20. A non-transitory computer-readable storage medium including instructions to perform a method comprising:
  receiving, at a mobile device, radio data associated with one or more radio nodes, wherein the received radio data is a candidate to be used for indoor position estimation of the mobile device; and
  outputting, based at least on the received radio data, a visualization that includes a textual expression indicating a suggested action associated with collection of additional radio data, wherein the additional radio data is also a candidate to be used for indoor position estimation, and
  wherein the textual expression indicating the suggested action comprises the textual expression indicating one or more of (i) an area at which the additional radio data should be collected or (ii) an area at which additional infrastructure should be deployed.

* * * * *